United States Patent [19]

Jen et al.

[11] Patent Number: 5,221,761

[45] Date of Patent: Jun. 22, 1993

[54] MELT TRANSESTERIFICATION PROCESS FOR THE PRODUCTION OF POLYCARBONATES

[75] Inventors: Kwan-Yue A. Jen, Old Bridge, N.J.; Terence Moran, Tuscaloosa, Ala.

[73] Assignees: Instituto Guido Donegani, Milan, Italy; Enichem America, Inc., Monmouth Junction, N.J.

[21] Appl. No.: 875,319

[22] Filed: Apr. 29, 1992

[51] Int. Cl.$^5$ .............. C08G 63/62; C07C 69/96; C07C 68/02; C08F 118/00

[52] U.S. Cl. ........................... 558/268; 544/35; 544/69; 544/106; 544/229; 546/13; 548/110; 549/4; 558/198; 558/277

[58] Field of Search .............. 558/268, 198, 277

[56] References Cited

U.S. PATENT DOCUMENTS

| | | | |
|---|---|---|---|
| 3,153,008 | 10/1964 | Fox | 558/268 X |
| 3,363,586 | 6/1976 | Ginnasi et al. | 558/277 |
| 3,510,507 | 5/1970 | Bown et al. | 558/268 |
| 4,218,391 | 8/1980 | Romano et al. | 558/277 |
| 4,318,862 | 3/1982 | Romano et al. | 558/268 |
| 4,330,664 | 5/1982 | Brunelle | 528/198 |
| 4,410,464 | 10/1983 | Hallgren | 558/268 |
| 4,554,110 | 11/1985 | Mark | 558/268 X |

FOREIGN PATENT DOCUMENTS 63-158719  7/1987  Japan ................... 558/268
62-169821  7/1987  Japan ................... 558/268

OTHER PUBLICATIONS

Article (pp. 457–467) "Studies in the Tetraarylborates" Part VII, The Preparation and Reagent Properties of Some New Nitrogen Heterocyclic Tetraarylboares—Especially Sodium Tetrakis (1-Imidazolyl) borate, A Novel Gravimetric Reagent for Hydrogen Ion by Chao and Moore (1978).

Primary Examiner—Floyd D. Higel
Attorney, Agent, or Firm—Oblon, Spivak, McClelland, Maier & Neustadt

[57] ABSTRACT

A melt transesterification process for the production of polycarbonates, wherein at least one bis(aryl)carbonate is reacted with at least one dihydric phenol in the melted state, in the presence of a transesterification catalyst comprising at least one heterocyclic borate salt of the formula:

$$M^+B(R)_n(A)^-_{4-n} \quad \text{(I)}$$

where $M^+$ is an alkali metal, tetra-alkylammonium, tetra-arylammonium, tetra-alkylphosphonium and tetra-arylphosphonium ion; R is H, alkyl, aryl or aralkyl; n is an integer from 0–3; and A is an aromatic or aliphatic heterocyclic ring.

16 Claims, No Drawings

MELT TRANSESTERIFICATION PROCESS FOR THE PRODUCTION OF POLYCARBONATES

BACKGROUND OF THE INVENTION

1. Field of the Invention

The present invention relates to a melt transesterification process for the production of polycarbonates. More particularly, the invention relates to a melt transesterification process of reacting a bis(aryl)carbonate and a dihydric phenol in the presence of a heterocyclic borate salt catalyst.

2. Discussion of the Background

The conventional method for the production of polycarbonates is an interfacial polymerization route employing phosgene as a raw material. Because of its toxicity and difficulties in transportation, phosgene causes considerable safety problems. It is usually manufactured on-site in a dedicated plant and transferred by pipeline to the vessel where it is to be used. Toxicity considerations notwithstanding, when phosgene is used, chlorine, obtained as a by-product, is converted to sodium chloride, the disposal of which presents ecological problems.

Thus, considerable effort has been devoted to replacing phosgene in polycarbonate manufacturing. A non-phosgene route of particular interest involves the production of dimethyl carbonate (DMC) by oxidative carbonylation of methanol with carbon monoxide and oxygen (U.S. Pat. No. 4,218,391, U.S. Pat. No. 4,318,862 and U.S. Pat. No. 3,963,586). The DMC is converted to a bis(aryl)carbonate by reaction with the corresponding phenol. For instance, diphenyl carbonate (DPC) is obtained by reaction of DMC with phenol (U.S. Pat. No. 4,554,110 and U.S. Pat. No. 4,410,464).

The preparation of aromatic polycarbonates from a bis(aryl)carbonate and a dihydric phenol, such as bisphenol-A (BPA), is performed by means of a transesterification process, which takes place in the melted state in the presence of a catalyst. In U.S. Pat. No. 4,330,664, hydrides of aluminum or boron are used for this purpose; particularly preferred are tetramethylammonium borohydride and lithium aluminum hydride. Japanese Application 62-158719 describes the preparation of polycarbonate by a transesterification route in the presence of $KBH_4$ as catalyst. In an alternative method, Japanese Application 62-169821 discloses a process in which a quaternary ammonium borohydride compound of formula $R'_4NBH_4$ is employed, where $R'$ is a $C_1-C_4$ alkyl, a $C_6-C_{10}$ aryl or a $C_6-C_{10}$ arylalkyl group.

SUMMARY OF THE INVENTION

It has now been discovered that it is possible to achieve a much faster rate and completion of the melt polycarbonate transesterification by using heterocyclic borate salts as catalysts. As a consequence, it is possible to produce polycarbonates endowed with particularly high molecular weights. Moreover, the heterocyclic borate salts offer other advantages, such as better solubility in reactants and products and very slight color due to by-products in the final polycarbonate.

DETAILED DESCRIPTION OF THE PREFERRED EMBODIMENTS

The present invention relates to a melt transesterification process for the production of polycarbonates, where at least one bis(aryl)carbonate is reacted with at least one dihydric phenol in the melt phase, in the presence of a transesterification catalyst comprising at least one heterocyclic borate salt of the formula:

$$M^+B(R)_n(A)^-_{4-n} \quad (I)$$

where $M^+$ is an alkali metal, tetra-alkylammonium, tetra-arylammonium, tetra-alkylphosphonium or tetra-arylphosphonium ion; R is H, alkyl, aryl or aralkyl; n is an integer from 0–3; and A is an aromatic or aliphatic heterocyclic ring.

The bis(aryl)carbonates, also commonly referred to as carbonic acid aromatic diesters, which can be used in the process of the present invention are well known in the art (see U.S. Pat. No. 4,330,664) and have the general formula:

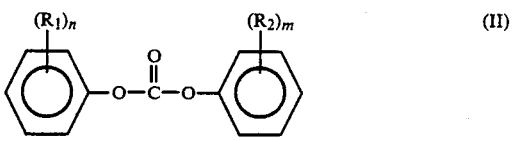

where $R_1$ and $R_2$ are, individually, selected from the group of fluorine, chlorine, bromine, hydroxy and methoxy groups, as well as $C_1-C_{10}$ alkyl, $C_3-C_8$ cycloalkyl, $C_6-C_{10}$ aryl, and $C_7-C_{14}$ aralkyl groups, optionally having one or more, preferably 1–3, substituents selected from fluorine, chlorine, bromine, hydroxy and methoxy groups; m and n are the same or different and range from 0 to 5.

Examples of these bis(aryl)carbonates, include diphenyl carbonate, dicresyl carbonate, bis(2-chlorophenyl)carbonate, the bis-phenyl carbonates of hydroquinone, resorcinol and 4,4'-dihydroxydiphenyl, etc.

The dihydric phenols, also commonly referred to as aromatic dihydroxy compounds, which can be used in the process of the present invention are also well known (U.S. Pat. No. 3,153,008). Preferred dihydric phenols are of the formula:

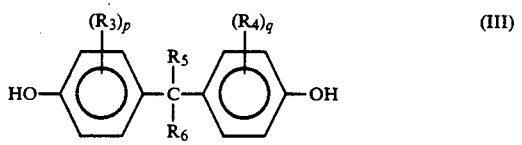

where $R_3$ and $R_4$, individually, are selected from the gorup of fluorine, chlorine, bromine and methoxy groups, as well as $C_1-C_{10}$ alkyl, $C_3-C_8$ cycloalkyl, $C_6-C_{10}$ aryl and $C_7-C_{14}$ aralkyl groups, optionally having one or more, preferably 1–3, substituents selected from fluorine, chlorine, bromine and methoxy groups; $R_5$ and $R_6$, individually, are hydrogen, $C_1-C_{10}$ alkyl, $C_3-C_8$ cycloalkyl, $C_6-C_{10}$ aryl, or $C_7-C_{14}$ aralkyl groups, optionally containing one or more, preferably 1–3, substituents selected from fluorine, chlorine, bromine, trifluoromethyl and methoxy groups; p and q, individually range from 0 to 4.

Specific examples of dihydric phenols suitable for use in the present invention include: 4,4'-dihydroxy-diphenyl-2,2-propane (commonly known as bisphenol-A), 4,4'-dihydroxy-diphenyl-1, butane, 4,4'-dihydroxy-diphenyl-2-chlorophenyl methane, 4,4'-dihydroxy-3-methoxy-diphenyl-2,2-propane, 4,4'-dihydroxy-3-isopropyl-diphenyl-2,2-propane, 4,4'-dihydroxy-diphenyl-2,2-nonane, 4,4'-hydroxy-2,2',3,3',5,5',6,6'-octamethyldiphenyl methane, 4,4'-dihydroxy-2,2'-dimethyl-5,5'-diter-butyl-diphenyl methane, 4,4'-dihydroxy-3,3'-5,5'-tetrachloro-diphenyl-2,2-propane, 4,4'-dihydroxy-3,3',5,5'-tetrabromo-diphenyl-2,2-propane, 4,4'-dihydroxy-3,3',5,5'-tetramethyl-diphenyl-2,2-propane, etc.

The heterocyclic borate salts of formula (I) are borate salts in which the boron atom is bonded to the heterocyclic rings. The heterocyclic rings generally contain from 1 to 3 heteroatoms selected from the group of nitrogen, oxygen and sulphur and have 5–18 ring atoms. Preferably, the heterocyclic ring is imidazole, benzimidazole, thiazole, oxazole, triazole, thiophene, furan, carbazole, pyrrole, indole, indoline, pyrrolidine, piperidine, piperazine, phenoxazine, phenothiazine, morpholine, etc. Particularly preferred are the heterocyclic rings containing from 1 to 3 nitrogen atoms, with a ring size of from 5 to 18 members. More particularly, the imidazole ring is preferred. The heterocyclic ring may be saturated or unsaturated and can be substituted with non-reactive groups, preferably 1-3 groups such as $C_1$–$C_{10}$ aryl, $C_3$–$C_8$ cycloalkyl, $C_6$–$C_{10}$ aryl, or $C_7$–$C_{14}$ aralkyl groups.

As counter ions $M^+$, alkali metal ions, such as lithium, sodium, or potassium, can be used. Alternatively, tetra-alkylammonium, tetra-arylammonium, tetra-alkylphosphonium and tetra-arylphosphonium cations can be employed, where the alkyl groups, individually, contain from 1 to 6 carbon atoms, while the aryl groups, individually, contain from 6 to 10 carbon atoms. The alkyl and aryl groups may be the same or different.

Preferred tetraalkyl cations are the tetramethyl, tetraethyl, tetrapropyl and tetrabutyl ammonium and phosphonium cations. Preferred tetraaryl cations are tetraphenyl ammonium and tetraphenyl phosphonium cations. The ammonium and phosphonium ions are particularly preferred, since they are able to further increase the solubility of the catalyst in the monomer melt, which greatly facilitates the homogeneity of the melt mixture.

Specific examples of heterocyclic borate salts suitable as catalysts for the present invention are sodium tetrakis(1-imidazolyl)borate, lithium tetrakis(2-thienyl)borate, lithium tetrakis(2-furyl)borate, sodium tetrakis(1-benzimidazolyl)borate, sodium and lithium tetrakis(3-thiazolyl)borate, as well as the tetramethylammonium, tetraethylammonium, tetrapropylammonium, tetrabutylammonium, tetramethylphosphonium, tetraethylphosphonium, tetrapropylphosphonium, and tetrabutylphosphonium salts of tetrakis(1-imidazolyl)borate, tetrakis(pyrrolidyl)borate, tetrakis(3-thiazolidyl)borate, tetrakis(1-benzimidazolyl) borate, tetrakis(2-thienyl)borate, and tetrakis(2-furyl) borate.

The borate salt catalysts of the present invention can be prepared by reacting boron trichloride ($BCl_3$) in a dry solvent with a preformed solution of an organolithium compound corresponding to the heterocyclic group of the catalyst to form the corresponding tri(heterocycle) boron compound. The tri(heterocycle) boron is then further reacted with an additional equivalent of the same organolithium compound to form the lithium tetrakis(heterocycle)borate catalyst.

For example, lithium tetrakis(2-thienyl)borate is prepared by reacting boron trichloride with 2-thienyl lithium under a protective gas atmosphere (typically argon or nitrogen) to form trithienyl boron. The trithienyl boron is further reacted with one equivalent of 2-thienyl lithium to form the desired lithium tetrakis(2-thienyl) borate catalyst. Similarly, catalysts having imidazole, benzimidazole, thiazole, oxazole, triazole, thiophene, furan, carbazole, pyrrole, indole, indoline, pyrrolidine, piperidine, piperazine, phenoxazine, phenothiazine and morpholine groups are prepared by reacting boron trichloride with a preformed solution of the corresponding lithium heterocycle to form the corresponding tri(heterocycle) boron compounds. Reaction of an additional equivalent of the lithium heterocycle with the tri(heterocycle) boron produces the desired lithium tetrakis(heterocycle)borate catalysts.

Borate salts containing 1–3 R groups where $M^+$ is an alkali metal ion are prepared from the alkali metal borohydrides, i.e., sodium borohydride ($NaBH_4$), potassium borohydride ($KBH_4$), lithium borohydride ($LiBH_4$), etc. The alkali metal borohydride is heated in a dry solvent under a protective gas atmosphere with 1, 2, 3 or 4 equivalents of the desired heterocyclic compound to produce the corresponding alkali metal borate salts containing 1, 2, 3 and 4 heterocyclic groups, respectively.

The reaction mixture is heated to a temperature sufficient to evolve hydrogen gas ($H_2$). The temperature is then slowly increased to drive the reaction to completion. The heating temperature will, of course, depend on the particular solvent used to prepare the borate salt catalysts. Suitable solvents include N-methyl pyrrolidone (NMP), dimethyl acetamide (DMAC), dimethyl formamide (DMF), etc. Heating is generally conducted in the temperature range from about 100° C. to about 300° C. The highest temperature should be below the decomposition temperature of the starting materials and products. After cooling the reaction mixture, the borate salt catalyst can be isolated by crystallization and filtration (Analytica Chemica Acta, 100:457–467, 1978).

The ammonium and phosphonium borate salts are prepared directly from the alkali metal borate salts using a metathetical reaction in aqueous solvent. For example, the tetraalkylammonium salts can be prepared from the lithium or potassium salts by reacting the alkali metal borate salt in water with a tetraalkylammonium halide salt. After stirring, the tetraalkylammonium borate salt can be extracted from the aqueous solution with an organic solvent and isolated by evaporation of the organic solvent. Preferred tetraalkylammonium halide salts are the chloride and bromide salts.

Similarly, the tetraalkyl phosphonium borate salt catalysts are prepared by metathetical reactions with the corresponding tetraalkylphosphonium halide salts and the alkali metal borate salts to form the tetraalkyl phosphonium borate salt catalysts. Preferred tetraalkyl phosphonium halides are the chlorides and bromides.

Alkali metal borate salt catalysts in which the boron is substituted with one or more alkyl, aryl, or aralkyl groups (R) are prepared from the corresponding borate salts containing 1, 2, 3 or 4 hydrogen atoms bonded to boron which are themselves prepared from sodium borohydride, potassium borohydride, lithium borohydride, etc. as described above. Reaction of the alkali metal borohydride with 1–4 equivalents of an organolithium compound (RLi) produces the corresponding borohydride having 1, 2, 3 or 4 alkyl, aryl, or aralkyl groups bonded to the boron atom. The corresponding tetraalkylammonium and tetraalkyl phosphonium salts are prepared directly from these alkali metal borate salts by a metathetical reaction as described above.

In general, effective ratios of heterocyclic borate salt to the dihydric phenol are within the range of from about 0.01 to 0.5 mole %, preferably from 0.05 to 0.15 mole %.

The transesterification reaction is generally conducted at temperatures ranging from about 200° to 300° C., preferably from 220° to 280° C., under an inert atmosphere and/or reduced pressure.

Other features of the invention will become apparent in the course of the following descriptions of exemplary embodiments which are given for illustration of the invention but are not intended to be limiting thereof. Examples reduced to practice in the laboratory are presented in the past tense, while examples constructively reduced to practice are presented in the present tense.

EXAMPLES

EXAMPLE 1

Sodium Tetrakis(1-Benzimidazolyl)Borate

To a stirred solution of benzimidazole (4.72 g, 40 mmole) in hexamethyl phosphoramide (10 ml) was added sodium borohydride (0.33 g, 10 mmole) in one portion. The mixture was heated under nitrogen gradually to the molten state with a heating mantle; hydrogen evolution started near 100° C. The temperature was slowly increased to 260° C., with the rate of increase adjusted according to the rate of hydrogen evolution. The heating was stopped 10 minutes after hydrogen evolution ceased; the mixture was cooled to 80° C. and 40 ml of tetrahydrofuran (THF) was added slowly. A yellow-white solid appeared upon the addition of tetrahydrofuran. After filtration, the solid was washed with acetone and dried (4.35 g, 95%).

EXAMPLE 2

Lithium Tetrakis(2-Furyl)Borate

To a stirred solution of boron trichloride (10 ml, 1M solution in hexane) in dry tetrahydrofuran (40 ml) is added a preformed solution of 2-furyl lithium (30 ml, 1M solution in tetrahydrofuran) dropwise at 0° C. under nitrogen. After 1 hour, the mixture is filtered, the solution is dried, and concentrated to obtain quantitative yield of trifurylboron.

The trifurylboron is further dissolved in dry tetrahydrofuran (30 ml), one equivalent of 2-furyllithium is added dropwise to the mixture of 0° C. under nitrogen. The precipitate formed is filtered and dried to obtain pure lithium tetra(2-furyl)borate.

EXAMPLE 3

Lithium Tetrakis(2-Thienyl)Borate

To a stirred solution of boron trichloride (10 ml, 1M solution of hexane) in dry THF (40 ml) is added a preformed solution of 2-thienyllithium (30 ml, 1M solution of THF) dropwise at 0° C. under nitrogen. After one hour, the mixture is filtered, the solution is dried and concentrated to obtain trithienyl boron.

The trithienyl boron is further dissolved in dry tetrahydrofuran (30 ml), one equivalent of 2-thienyllithium is added dropwise to the mixture at 0° C. under nitrogen. The precipitate formed is filtered and dried to obtain pure lithium tetra(2-thienyl)borate.

EXAMPLE 4

Sodium Tetrakis(Thiazolidyl)Borate

To a stirred solution of thiazolidine (3.57 g, 40 mmole) in hexamethyl phosphoramide (15 ml) is added sodium borohydride (0.33 g, 10 mmole) in one portion. The mixture is heated under nitrogen gradually to the molten state with a heating mantle; hydrogen evolution starts near 60° C. The temperature is slowly increased to 260° C., with the rate of increase adjusted according to the rate of hydrogen evolution. The heating is stopped 10 minutes after hydrogen evolution ceased; the mixture is cooled to 80° C. and 40 ml of tetrahydrofuran is added slowly. A white solid appears upon the addition of THF. After filtration, the solid was washed with acetone and dried to get pure product (3.44 g, 90%).

EXAMPLE 5

Tetrabutylammonium Tetrakis(2-Thienyl)Borate

To a stirred solution of tetrabutylammonium bromide (3.22 g, 10 mmole) in water (25 ml) is added in one portion a solution of lithium tetra(2-thienyl)borate (3.43 g, mmole) in water (15 ml). The mixture is stirred at room temperature for two hours then extracted with methylene chloride (200 ml). The organic layer is dried over anhydrous sodium sulfate and concentrated to obtain pure product (5.32 g, 92%).

EXAMPLE 6

Tetrabutylammonium Tetrakis(1-Benzimidazolyl)Borate

To a stirred solution of tetrabutylammonium bromide (3.22 g, 10 mmole) in water (25 ml) is added in one portion a solution of sodium tetrakis(1-benzimidazolyl)borate (4.77 g, 10 mmole) in water (40 ml). The mixture is stirred at room temperature for two hours then extracted with methylene chloride (250 ml). The organic layer is dried over anhydrous sodium sulfate and concentrated to obtain pure product (6.26 g, 90%).

EXAMPLE 7

Tetrabutylphosphonium Tetrakis(2-Thienyl)Borate

To a stirred solution of tetrabutylphosphonium chloride (2.95 g, 10 mmole) in water (25 ml) is added in one portion a solution of lithium tetra(2-thienyl)borate (3.43 g, 10 mmole) in water (15 ml). The mixture is stirred at room temperature for two hours then extracted with methylene chloride (200 ml). The organic layer is dried over anhydrous sodium sulfate and concentrated to obtain pure product (5.21 g, 90%).

EXAMPLE 8

Tetrabutylammonium Tetrakis(1-Imidazolyl)Borate

To a stirred solution of tetrabutylammonium bromide (3.22 g, 10 mmole) in water (25 ml) is added in one portion a solution of sodium tetrakis(1-imidazolyl)borate (3.02 g, 10 mmole, purchased from Aldrich Chemical Co., Inc.) in water (15 ml). The mixture is stirred at room temperature for two hours then extracted with methylene chloride (200 ml). The organic layer is dried over anhydrous sodium sulfate and concentrated to obtain pure product (4.74 g, yield 91%).

EXAMPLE 9

Tetrabutylphosphonium Tetrakis(1-Imidazolyl)Borate

To a stirred solution of tetrabutylphosphonium chloride (2.95 g, 10 mmole) in water (25 ml) is added in one portion a solution of sodium tetrakis(1-imidazolyl)borate (3.02 g, 10 mmole) in water (15 ml). The mixture is stirred at room temperature for 2 hours then extracted with methylene chloride (200 ml). The organic layer is dried over sodium sulfate (anhydrous), concentrated to obtain pure product (4.96 g, yield 92%).

EXAMPLE 10

228 g (1.00 mole) of Bisphenol-A, 224 g (1.05 mole) of diphenyl carbonate and 0.52 g (0.001 mole) of tetrabutylammonium tetrakis (1-imidazolyl) borate were added to a four necked glass reactor. The reactor was equipped with a steel mechanical stirrer, a digital thermometer and a heating mantle having a digital temperature controller. For the removal of phenol, excess diphenyl carbonate and volatile by-products, the reactor was connected to a short path distillation head with a vacuum adapter and heating tape.

The reaction mixture was blanketed under a slow stream of argon and heated with the mantle having an initial set point of 200° C. as the internal temperature. After 10 minutes, when the mixture melted to provide a clear colorless liquid, the reactor was evacuated to a pressure of 20 mmHg with a water aspirator to facilitate the removal by distillation of the primary by-product, i.e. phenol. The set point of the heater was raised to an internal temperature of 220° C. for 20 minutes. Then, the reaction mixture was heated to 260° C. in 10° C. increments for a total of 30 minutes. After 10 minutes at 260° C., the reactor pressure was further reduced to 0.5 mmHg using a high vacuum pump and mainfold. This was to assure the removal of the diphenyl carbonate which was formed on heating the low molecular weight intermediate product. The first stage melt polymerization was completed by heating for additional 20 minutes at 260° C. The mixture remained colorless throughout these procedures.

The final reaction mixture was allowed to cool under argon to ambient temperature. Then it was dissolved in 1.0 liter of chloroform and added dropwise to 3.0 liters of methanol with rapid stirring over two hours. Analysis by gas phase chromatography (GPC) indicated a $-M_w=17,000$ when compared to known calibration standards. The differential scanning calorimetry (DSC) data showed a $T_g$ of 140° C. for this first stage polymer.

EXAMPLE 11

The same reaction conditions and procedure of Example 10 were employed, using tetrabutylphosphonium tetrakis (1-imidazolyl) borate as the catalyst. Analysis by GPC indicated $-M_w=21,000$ when compared to known calibration standards. The DSC data showed a $T_g$ of 138° C. for this first stage polymer.

EXAMPLE 12

The same reaction conditions and procedure of Example 10 were employed, using sodium tetrakis (1-imidazolyl) borate as the catalyst. Analysis by GPC indicated a $-Mw=13,000$ when compared to known calibration standards. The DSC data showed a $T_g$ of 120° C. for this first stage polymer.

EXAMPLES 13-16 (COMPARATIVE)

The same reaction conditions and procedure of Example 10 were employed to test melt transesterification catalysts of the prior art. The results are reported, for ease of comparison, in Table I.

TABLE I

| EX. | CATALYST | CUMULATIVE REACTION TIME (hr) | REACTION TEMP. (°C.) PRESS. (mmHg) | $T_g$ (°C.) | $-Mw$ |
|---|---|---|---|---|---|
| 10 | n-Bu$_4$NB(Im)$_4$ | 1.5 | 200–260/20–0.5 | 140 | 17,000 |
| 11 | n-Bu$_4$PB(Im)$_4$ | 1.5 | 200–260/20–0.5 | 138 | 21,000 |
| 12 | NaB(Im)$_4$ | 1.5 | 200–260/20–0.5 | 120 | 13,000 |
| 13* | NaB(Ph)$_4$ | 1.5 | 200–260/20–0.5 | 109 | 11,000 |
| 14* | Me$_4$NBH$_4$ | 6 | 200–270/30–0.5 | 118 | 12,000 |
| 15* | n-Bu$_4$NB(Ph)$_4$ | 1.5 | 200–260/20–0.5 | 121 | 12,000 |
| 16* | (Ph)$_4$PB(Ph)$_4$ | 1.5 | 200–260/20–0.5 | 129 | 16,000 |

*Comparative examples.

The experimental data reported in Table I clearly show that by using heterocyclic borate salts, it is possible to achieve rates of polymerization nearly double with respect to those of the prior art. Compare, for instance, Example 2, where tetrabutylphosphonium tetrakis (1-imidazolyl) borate is used, with Example 5 in which tetramethylammonium borohydride is employed. Moreover, some other benefits are achieved by utilizing heterocyclic borate salts as efficient catalysts for melt polymerization when compared to catalysts in the prior art, such as more complete solubility of the catalyst in reactants and products, final products with little or no color, and a wide range of variability with respect to structure which allows one to find the most suitable catalyst for specific polymerization conditions.

EXAMPLE 17

Tetraethylammonium (1-Pyrrolyl)Triphenylborate

A mixtue of sodium hydride (0.45 g, 19 mmole) and triphenylboron (3.6 g, 15 mmole) in tetrahydrofuran (100 ml) was slowly added to a stirred solution of pyrrole (1.01 g, 15 mmole) in anhydrous tetrahydrofuran. The mixture was stirred for five hours under nitrogen at room temperature, and the resulting dark solution was filtered through filter paper and diluted with an equal amount of water. An excess of tetraethylammonium chloride solution was added slowly and the precipitate which formed was collected, dissolved in acetone and purified by addition of the acetone solution to water. The product tetraethylammonium (1-pyrrole)triphenylborate was collected (4.52 g, 72%).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A melt transesterification process for the production of polycarbonates, comprising:
reacting a bis(aryl)carbonate with a dihydric phenol in the melt phase, in the presence of a transesterification catalyst comprising at least one heterocyclic borate salt of the formula:

$$M^+B(R)_n(A)^-_{4-n} \qquad (I)$$

wherein M+ is selected from the group consisting of alkali metal, tetra-alkylammonium, tetra-arylammonium, tetra-alkylphosphonium and tetra-arylphosphonium ions; R is H, alkyl, aryl or aralkyl; n is an integer from 0–3; and A is a heterocyclic ring.

2. The process of claim 1, wherein said bis(aryl)carbonate has the formula:

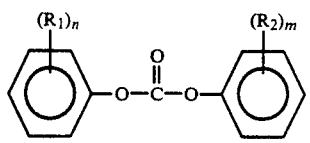

wherein $R_1$ and $R_2$, individually, are fluorine, chlorine, bromine, hydroxy, methoxy, unsubstituted $C_1$–$C_{10}$ alkyl, $C_5$–$C_8$ cycloalkyl, $C_6$–$C_{10}$ aryl or $C_7$–$C_{14}$ arylalkyl groups, or $C_1$–$C_{10}$ alkyl, $C_5$–$C_8$ cycloalkyl, $C_6$–$C_{10}$ aryl or $C_7$–$C_{14}$ aralkyl group substituted by fluorine, chlorine, bromine, hydroxy or methoxy groups; m and n, individually, are 0–5.

3. The process of claim 2, wherein said bis(aryl)carbonate is diphenyl carbonate.

4. The process according to claim 1, wherien said dihydric phenol has the formula:

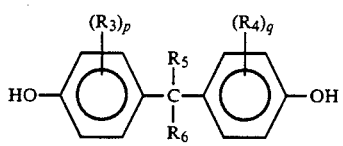

wherein $R_3$ and $R_4$, individually, are fluorine, chlorine, bromine, hydroxy, methoxy, unsubstituted $C_1$–$C_{10}$ alkyl, $C_5$–$C_8$ cycloalkyl, $C_6$–$C_{10}$ aryl or $C_7$–$C_{14}$ aralkyl groups, or $C_1$–$C_{10}$ alkyl, $C_5$–$C_8$ cycloalkyl, $C_6$–$C_{10}$ aryl or $C_7$–$C_{14}$ aralkyl group substituted by fluorine, chlorine, bromine, hydroxy or methoxy groups; $R_5$ and $R_6$, individually, are hydrogen, unsubstituted $C_1$–$C_{10}$ alkyl, $C_5$–$C_8$ cycloalkyl, $C_6$–$C_{10}$ aryl, or $C_7$–$C_{14}$ aralkyl groups, or $C_1$–$C_{10}$ alkyl, $C_5$–$C_8$ cycloalkyl, $C_6$–$C_{10}$ aryl or $C_7$–$C_{14}$ aralkyl groups substituted by fluorine, chlorine, bromine, hydroxy or methoxy groups; p and q, individually, are 0–4.

5. The process of claim 4, wherein said dihydric phenol is 4,4'-dihydroxy-diphenyl-2,2-propane.

6. The process of claim 1, wherein said heterocyclic ring A contains from 1 to 3 heteroatoms selected from the group consisting of nitrogen, oxygen and sulphur.

7. The process of claim 6, wherein said heterocyclic ring A is an unsubstituted imidazole, benzimidazole, thiazole, oxazole, triazole, thiophene, furan, carbazole, pyrrole, indole, indoline, pyrrolidine, piperidine, piperazine, phenoxazine, phenothiazine, or morpholine group, or said group substituted by $C_1$–$C_{10}$ alkyl, $C_3$–$C_8$ cycloalkyl, $C_6$–$C_{10}$ aryl, or $C_7$–$C_{14}$ arylalkyl groups.

8. The process of claim 7, wherein said heterocyclic ring A is imidazole.

9. The process of claim 1, wherein R is a tetra-alkylammonium, tetra-arylammonium, tetra-alkylphosphonium or tetra-arylphosphonium group, in which the alkyl groups, individually, contain from 1 to 6 carbon atoms, and the aryl groups, individually, contain from 6 to 10 carbon atoms.

10. The process of claim 1, wherein the ratio of heterocyclic borate salt to the dihydric phenol is within the range of from 0.01 to 0.5 mole %.

11. The process of claim 10, wherein the ratio of heterocyclic borate salt to the dihydric phenol is within the range of from 0.05 to 0.15 mol %.

12. The process of claim 1, wherein said reacting step is conducted at temperatures ranging from 200° to 300° C. under an inert atmosphere, reduced pressure or both.

13. The process of claim 1, wherein n=0.
14. The process of claim 1, wherein n=1.
15. The process of claim 1, wherein n=2.
16. The process of claim 1, wherein n=3.

* * * * *